Jan. 2, 1968   H. J. BEXON ET AL   3,361,085
RAILWAY VEHICLE

Filed May 24, 1965                                2 Sheets-Sheet 1

INVENTORS
HOWARD J. BEXON
CONRAD D. GRIS
BY Church & Rogers
PATENT AGENTS

Jan. 2, 1968  H. J. BEXON ETAL  3,361,085
RAILWAY VEHICLE

Filed May 24, 1965  2 Sheets-Sheet 2

*INVENTOR.*
HOWARD J. BEXON
CONRAD D. GRIS

BY *Church & Rogers*

PATENT AGENTS

United States Patent Office 3,361,085
Patented Jan. 2, 1968

3,361,085
RAILWAY VEHICLE
Howard J. Bexon, Oakville, Ontario, and Conrad D. Gris, Hamilton, Ontario, Canada, assignors to Dominion Foundries and Steel, Limited, Hamilton, Ontario, Canada
Filed May 24, 1965, Ser. No. 457,917
7 Claims. (Cl. 105—196)

ABSTRACT OF THE DISCLOSURE

In a six-wheel, two-transom railway truck each transom is disposed between an adjacent pair of axles; the centre portions of the transoms are depressed below the level of the adjacent parts of the side frames and the vehicle body is mounted by a centrally-disposed, load-carrying pivot bearing on one transom and a centrally-disposed load-carrying sliding friction bearing on the other transom.

---

Figure 1:
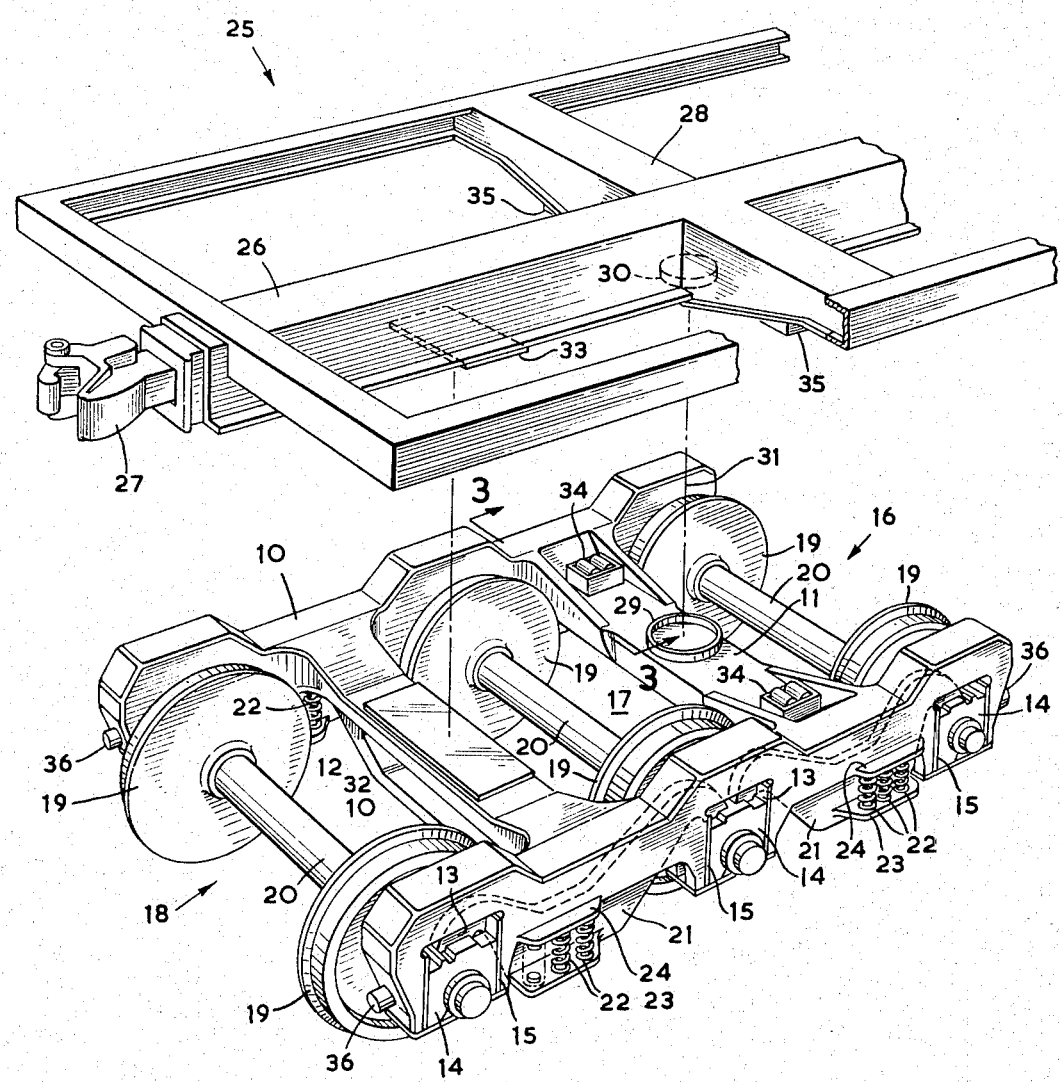

This invention relates to railway rolling stock, and more particularly to a six wheel truck having a pivot connection to a railway vehicle body supported by the truck. The invention relates more particularly to an improved six wheel truck especially adapted for freight vehicles.

There has been a continual demand for higher capacity cars in freight railroading practice because of the economies of handling that can be achieved by their use. Because of the limitation of the load allowed for each standard axle an increased payload (or converse reduced axle loading) can, in practice, only be achieved by increasing the number of axles, so that six wheel trucks are now commonly used.

In conjunction with the demand for more weight-carrying capacity, there is an increasing demand for safe and stable operation at higher speed and for longer mileages, requiring improved riding qualities in a truck that must still be manufactured and maintained as inexpensively as possible.

It is a further requirement of modern freight vehicle trucks that they can accommodate sliding centre sill cushioning draft devices without increasing appreciably the overall height of the sill.

It is an object of the present invention to provide an improved six wheel railway truck. It is another object of the invention to provide a new six wheel railway truck particularly applicable to freight vehicles.

It is a further object to provide an improved six wheel truck having a one piece rigid frame with two spaced transoms located respectively between the two pairs of immediately adjacent wheels.

In accordance with the present invention there is provided a six-wheel railway vehicle truck for mounting a railway vehicle body and comprising three spaced parallel wheel and axle assemblies, each assembly comprising a pair of wheels and an associated axle, and a truck frame supported on said assemblies, the truck frame comprising two spaced parallel side frames, two spaced parallel transoms disposed between the side frames transversely thereof and connecting the side frames to one another, a first of the two transoms being disposed between two immediately adjacent assemblies, and the second transom being disposed between the other two immediately adjacent assemblies, a first truck frame bearing member for a loading-bearing, truck frame first bearing having a generally vertical pivot axis, the said first truck frame bearing member being disposed on the first transom generally centrally thereof and being adapted for mounting a first body bearing member of an associated vehicle body on the truck frame for pivoting movement about the said pivot axis, and a second truck frame bearing member for a single, loading-bearing, truck frame second bearing disposed on the said second transom generally centrally thereof and adapted for mounting a second body bearing member of the said associated vehicle body on the truck frame for relative transverse movement between the second truck frame bearing member and the second body bearing member about the said pivot axis of the truck frame first bearing.

Figure 2:
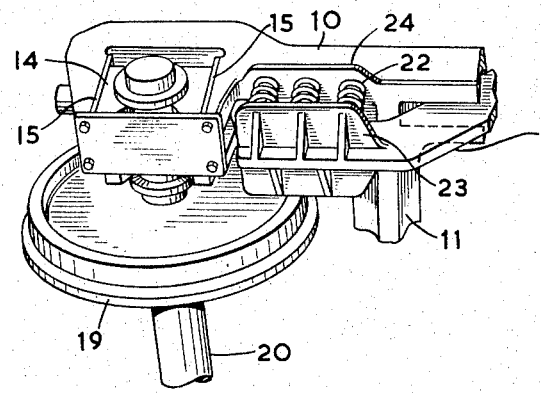
Figure 3:
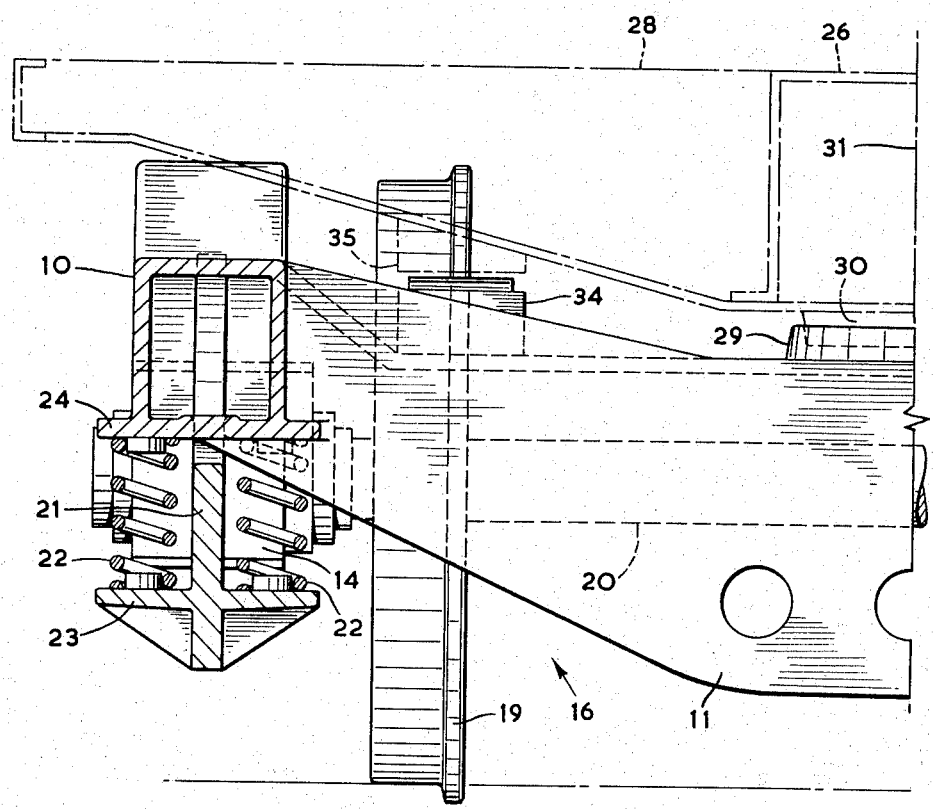

A particular preferred embodiment of the invention will now be described, by way of example, with reference to the accompanying drawings, wherein:

FIGURE 1 is a perspective view of a six wheel railway vehicle truck and corresponding end part of the vehicle frame on which an associated vehicle body is mounted, FIGURE 2 is a view from below of a detail to show the way in which the equalizer bars of the suspension pass through the frame, and FIGURE 3 is a view taken generally on the line 3—3 of FIGURE 1.

The truck proper comprises a truck frame consisting of two spaced parallel frame side members 10 (usually called side frames) connected together by two spaced parallel transoms 11 and 12 which extend between the side members 10. Each side member has journal box recesses 13 formed therein in which respective journal boxes 14 are slidably mounted by replaceable guide means 15. The frame is mounted on three wheel and axle assemblies 16, 17 and 18, each assembly consisting of a pair of wheels 19 and a connecting axle 20 mounted in the associated pair of journal boxes 14. Two pairs of equalizer bars 21 are provided, extending into corresponding recesses in the side members 10, each bar having its inner end engaged with the respective journal box of the inner assembly 17, and its outer end engaged with the respective journal box of the immediately adjacent outer assembly 16 or 18. Two sets of compression springs 22 are associated with each equalizer bar, the two sets being disposed on opposite sides of the bar, the springs having their bottom ends abutting end members 23 which are integral with the equalizer bars, and their upper ends abutting side extensions 24 of the side members, so that the truck frame is resiliently supported by the springs and the equalizer bars on the wheel and axle assemblies.

The first transom 11 is disposed between the two immediately adjacent assemblies 16 and 17, while the second transom 12 is disposed between the other two immediately adjacent assemblies 17 and 18. The vehicle body frame on which an associated vehicle body is mounted is indicated generally by 25 and comprises a central hollow longitudinal sliding sill member 26 carrying within itself a sliding sill draft mechanism (not illustrated) which has the usual coupler 27 attached to one end. The sill member is provided near each end with a transverse bolster 28 which cooperates with the first transom 11. Part of the load represented by the vehicle frame, the vehicle body and its contents which is carried by this truck is transmitted to the truck through a load-bearing, first bearing associated with the first transom 11 and the bolster 28, this first bearing being constituted by a truck frame first bearing member 29 disposed generally centrally of the transom, and a cooperating body first bearing member 30 disposed generally centrally of the bolster 28. The pivot axis of this first bearing is indicated by 31 and is generally vertical in normal operating attitude of the truck. The remainder of the vehicle body load is transmitted to the truck through a single, centrally-disposed, load-bearing, second bearing, which is a friction bearing constituted by a truck frame second bearing member 32 disposed generally centrally of the second transom 12, and a cooperating body second bearing member 33 disposed on the longitudinal sill member 26.

Referring especially to FIGURE 3, it will be noted that, in respective transverse planes which are perpendicular to the length of the truck frame, the central portions of the transoms, together with the centrally-disposed bearing surfaces of the associated bearings mounted thereon, are depressed well below the level of the upper surfaces of the adjacent portions of the truck side frames to which the transoms are connected; the lower limit at which the transom central portions and the associated bearing surfaces can be disposed is of course set by the need to maintain adequate clearance between the axles in their uppermost operative positions and the vehicle body in its lowermost operative position.

In this embodiment the body member 33 is of smaller transverse dimension than the truck frame member 32, the transverse dimension of the latter being sufficient to maintain full engagement of the two members over the maximum designed angular displacement thereof relative to one another about the pivot axis 31. Conventional means (not shown) may be provided for lubrication of both the first pivot bearing and the second friction bearing, and for some embodiments means may be provided to prevent the entry of dirt and other friction causing material to the bearings.

A pair of side bearings are also provided comprising two truck frame side bearing members 34 disposed on the transom 11 diametrically opposite to one another with respect to the pivot axis 31, each truck frame member cooperating with a corresponding body bearing member 35 on the bolster 28. In this embodiment each truck frame member comprises a pair of rollers mounted with their axes of rotation coextensive with one another and passing through the said vertical axis 31, while the cooperating bolster members 35 are flat plates mounted on the bolster.

The truck will normally be provided with a braking mechanism operable on all six wheels, which can be of conventional form, and is not illustrated, since it does not form part of the present invention.

It is important in the operation of a truck in accordance with this invention that the truck frame is sufficiently rigid, and in a preferred embodiment this is achieved by making the side members 10 and the transoms 11 and 12 integral with one another. In this particular embodiment the whole frame is cast as a single unit, although in other embodiments it may be fabricated from separate pieces. It is necessary to machine various working surfaces, such as those of the journal box guide means 15 and the bearing surfaces of the bearing members 29, 30 and 32, 33, but in practice this is not found to be disadvantageous, since replaceable wear plates can be provided at such wearing points, assuring reliable performance even when worn, and substantially simplifying and cheapening any subsequent maintenance. Axle movement can be controlled by simple friction devices such as 36, which are shown as fitted to the end assemblies 16 and 18, but which can also be fitted to the assemblies 17, if necessary. Because the frame itself does not have relatively sprung parts these friction devices will not be worked as hard as in previously known trucks using relatively pivoted frame members, giving an improved effect and longer life. The whole frame is spring-mounted on the wheel and axle assemblies so that the unsprung weight is at a minimum, thereby reducing the shock loads applied to the wheels and the track and increasing their useful life.

It is also important in our new truck that the load is distributed between the two spaced transoms, each of which is located between two immediately adjacent assemblies. A minimum transom and bolster depth is essential to provide the necessary strength and rigidity, and by locating the transoms between the assemblies the required depths can readily be achieved, while permitting the use of known vehicle body designs without requiring raising of the sills thereof. Moreover, it is also possible to accommodate without difficulty sliding centre sill draft devices, which more and more are preferred because of the additional protection they provide against damage to the vehicle and to the vehicle loads.

Because of the two point attachment of each truck to the associated vehicle body the body loads are more evenly applied to the truck, reducing the bending moments applied to the truck and the body, and permitting a lighter construction for both. Moreover, since the body engages the truck at two longitudinally spaced points, tilting of the truck under the effect of acceleration and braking forces can be more effectively opposed, minimizing weight transfer between the truck axles under these conditions.

It is necessary to control horizontal "hunting" oscillations of the truck relative to the body in a generally horizontal plane, and this has normally been accomplished hitherto by means of special side bearings, whereas in our new truck construction the required degree of opposition to such oscillations is provided by the sliding friction in the second bearing. The usual substantial clearance can be provided between the side bearing members to permit the truck frame to follow normal changes in the road bed without the side bearing members engaging and applying undesired twisting forces to the vehicle body.

Either the first or the second bearing can be the longitudinally "inboard" bearing (i.e. nearer to the middle of the vehicle body) depending on the vehicle body employed and the effect desired. Thus, if the first pivot bearing is inboard then there is a "long" lever arm between the truck front wheel assembly 16 and the first bearing which is particularly effective in moving the truck about the pivot bearing, so that the minimum sideways flange pressure is applied to the wheels of the assembly 16 in turning the truck under heavy load. The second friction bearing can be placed under the body end sill so that the conventional overhang is obtained and there is no additional tendency to "jackknife" under suddenly applied end loads. Alternatively, in very long cars the second friction bearing can be inboard, reducing the jackknife tendency at the expense of greater sideways overhang at the middle of the vehicle and greater resistance to the turning of the truck, such an arrangement being particularly advantageous in long light vehicles, such as those used for transport of automobiles.

Trucks in accordance with this invention also are advantageously employed in light vehicles, such as the above mentioned auto transport vehicles which carry a light but expensive load. Such vehicles are required to operate at high speeds for long periods of time, and yet are fitted with relatively small wheels to achieve the maximum possible vehicle body height. In this and similar applications our new truck provides a rigid, precision wear-free frame required for continuous high speeds, the riding qualities desired to minimize damage to the expensive load, moderately loaded small wheels with maximum vehicle height despite the provision of a sliding sill draft device, and minimum and relatively inexpensive maintenance.

Although in the embodiment particularly described an equalizer spring suspension system is disclosed for opposing weight transfer between the wheel and the axle assemblies, in other embodiments other systems may of course be employed. For example, it is envisaged that each journal box 14 may be individually sprung by a mechanical spring or springs, or by a combination of air and mechanical springs, located between each journal box and the truck frame. Such a system may also be arranged to compensate for changes in the vehicle coupler height as the load is changed.

The embodiments of the invention in which an exclusive property or privilege is claimed are defined as follows:

1. A six wheel railway vehicle truck for mounting a railway vehicle body and comprising three spaced parallel wheel and axle assemblies, each assembly comprising a pair of wheels and an associated axle, and a truck frame supported on said assemblies, the truck frame comprising two spaced parallel side frames, two spaced parallel transoms disposed between the side frames transversely thereof, connecting the side frames to one another, and having depressed central portions disposed below the level of the upper surfaces of the portions of the side frames to which they are connected, a first of the two transoms being disposed between two immediately adjacent assemblies, and the second transom being disposed between the other two immediately adjacent assemblies, a first truck frame bearing member for a load-bearing, truck frame first bearing having a generally vertical pivot axis, the said first truck frame bearing member being disposed on the first transom generally centrally thereof on the said depressed central portion, providing a bearing surface disposed below the level of the upper surfaces of the side frames in the same plane perpendicular to the length of the truck frame, and being adapted for mounting a first body bearing member of an associated vehicle body on the truck frame for pivoting movement about the said pivot axis, and a second truck frame bearing member for a single, load-bearing, truck frame second bearing disposed on the said second transom generally centrally thereof and adapted for mounting a second body bearing member of the said associated vehicle body on the truck frame for relative transverse frictional sliding movement between the truck frame second bearing member and the second body bearing member about the said pivot axis of the truck frame first bearing.

2. A six wheel railway vehicle truck as claimed in claim 1, and comprising two side bearing members disposed on the truck frame at least approximately diametrically opposite to one another with respect to the pivot axis of the first truck frame bearing member and spaced therefrom.

3. A six wheel railway vehicle truck as claimed in claim 1, wherein the said truck frame is an integral member with the said two spaced parallel transoms rigidly connecting the truck side frames to one another.

4. A railway vehicle as claimed in claim 3, wherein the said second body bearing member is of smaller transverse dimension than the second truck frame bearing member, and the transverse dimension of the latter member is of an extent to maintain full engagement of the two bearing members over the maximum designed angular displacement of the truck frame and the vehicle frame to one another about the said pivot axis.

5. In a railway vehicle comprising a six wheel truck and a vehicle body supported thereon, a six wheel truck comprising three spaced parallel wheel and axle assemblies, each assembly comprising a pair of wheels and an associated axle, and a truck frame supported on said assemblies, the truck frame comprising two spaced parallel side frames, two spaced parallel transoms disposed between the side frames transversely thereof, connecting the side frames to one another, and having depressed central portions disposed below the level of the upper surfaces of the portions of the side frames to which they are connected, a first of the transoms being disposed between two immediately adjacent assemblies, and the second transom being disposed between the other two immediately adjacent assemblies, a first truck frame bearing member for a load-bearing, truck frame first bearing having a generally vertical pivot axis, the said first truck frame bearing member being disposed on the first transom generally centrally thereof on the said depressed central portion and providing a bearing surface disposed below the level of the upper surfaces of the side frames in the same plane perpendicular to the length of the truck frame, a vehicle frame adapted to support the superstructure of the vehicle body and comprising a first body bearing member cooperating with the said first truck frame bearing member for mounting the vehicle frame for pivoting movement about the said pivot axis, the truck frame also comprising a second truck frame bearing member for a single, load-bearing, truck frame second bearing disposed on the said second transom generally centrally thereof on the said depressed central portion and providing a bearing surface disposed below the level of the upper surfaces of the side frames in the same plane perpendicular to the length of the truck frame, and the vehicle frame also comprising a second body bearing member cooperating with the second truck frame bearing member for relative transverse frictional sliding movement between the truck frame and the vehicle frame about the said pivot axis of the first truck frame bearing member.

6. A railway vehicle as claimed in claim 5, and comprising two truck frame side bearing members disposed on the truck frame at least approximately diametrically opposite to one another with respect to the pivot axis of the first truck frame bearing member, and spaced from the first truck frame bearing member, and respective cooperating spaced body side bearing members on the vehicle frame.

7. A railway vehicle as claimed in claim 5, wherein the said truck frame is an integral member with the said two spaced parallel transoms rigidly connecting the truck side frames to one another.

References Cited

UNITED STATES PATENTS

| | | | |
|---|---|---|---|
| 33,167 | 8/1861 | Youmans | 105—196 X |
| 1,331,887 | 2/1920 | Van Dyke | 105—199 X |
| 1,895,500 | 1/1933 | Todd | 105—200 X |
| 2,769,401 | 11/1956 | Wintemberg | 105—196 X |
| 3,277,843 | 10/1966 | Horner et al. | 105—183 X |

ARTHUR L. LA POINT, *Primary Examiner.*

H. BELTRAN, *Assistant Examiner.*